W. H. HAYLOCK & A. BENEDICT.
Wagon-Spring.

No. 198,298. Patented Dec. 18, 1877.

WITNESSES:
Henry N. Miller
J. H. Scarborough

Inventors
W. H. Haylock.
A. Benedict.
BY Munn & Co
ATTORNEYS.

UNITED STATES PATENT OFFICE.

WILLIAM H. HAYLOCK AND ALONZO BENEDICT, OF JONESVILLE, N. Y., ASSIGNORS TO THEMSELVES AND JOHN HIGGINS, OF SAME PLACE.

IMPROVEMENT IN WAGON-SPRINGS.

Specification forming part of Letters Patent No. 198,298, dated December 18, 1877; application filed October 23, 1877.

*To all whom it may concern:*

Be it known that we, WILLIAM H. HAYLOCK and ALONZO BENEDICT, of Jonesville, in the county of Saratoga and State of New York, have invented a new and useful Improvement in Wagon-Springs, of which the following is a specification:

This invention relates to springs for side-bar vehicles, the object being to insure an easy motion, avoiding the pitching backward and forward common to most springs, and maintain the body of the vehicle in a level position, regardless of where the weight is placed.

The invention consists in making the side bars each of two parts, joined together at the middle of the vehicle by a flexible steel plate, which is secured, by a clip or otherwise, to the center of a side spring, whose ends are attached, one to each of the two parts of the side bar.

The side bars are connected to the end springs of the vehicle, as usual.

The invention also consists in the construction of the flexible plate, and the connection with the same and the side bar of the body of the vehicle, as will be hereinafter described.

Figure 1:
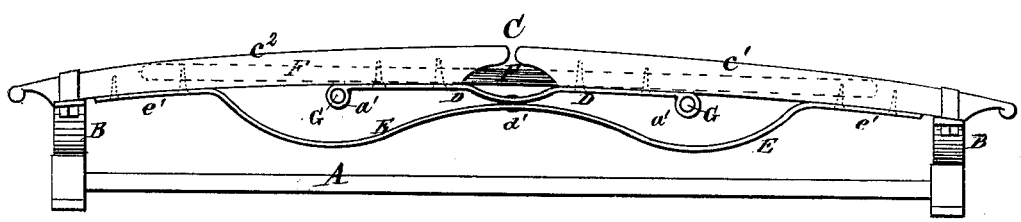
Figure 2:
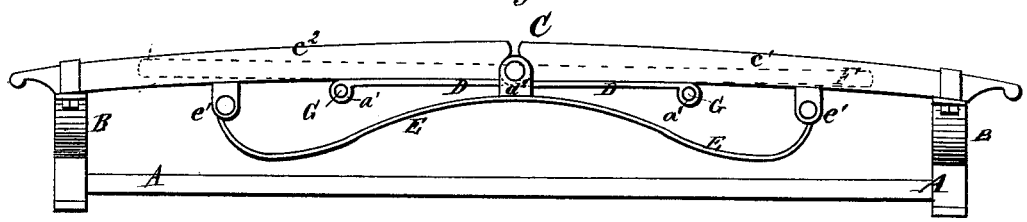
Figure 3:
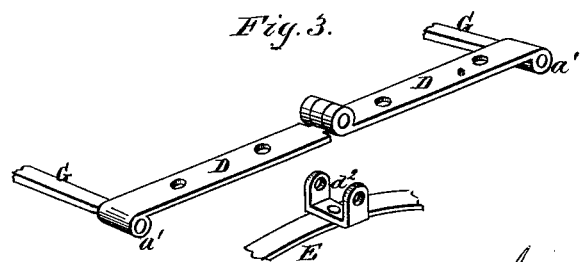

In the accompanying drawings, Figure 1 represents a side view of a wagon-frame with our improvement attached. Fig. 2 is a similar view, showing a modification of our improvement. Fig. 3 is a perspective detail view, illustrating the joint connection of the flexible plate and the side spring.

Similar letters of reference indicate corresponding parts.

A is the wagon-frame. B are the end springs, to which are secured, by a clip or otherwise, the ends of the side bar C. This is made in two parts, $c^1$ and $c^2$, united at the center by the flexible steel plate D, the latter being bolted with its two ends to the two parts $c^1$ $c^2$ of the side bar C.

The steel plate D is made flexible, either by the elasticity of the plate itself, as in Fig. 1, or by being made in two parts united by a hinge, as in Figs. 2 and 3.

The plate D is connected at its center to the center of the side spring E, either by riveting, as shown at $d^1$ in Fig. 1, or by inserting its hinge in a clip or jaw, $d^2$, on the spring E, and securing it there by one common hinge-pin, as shown in Figs. 2 and 3. The ends of the spring E are fastened to the two parts $c^1$ $c^2$ of the side bar C at $e'$, either by bolts or screws, as in Fig. 1, or by a clip or hinge connection, as in Fig. 2.

F is the body of the wagon. This we prefer to support and connect to the side bars C by bolting to it two supporting cross-bars, G, and securing their ends in the eyes $a'$, formed of or on the ends of the steel plate D, by which the two parts of the side bar C are connected together. The inner ends of the two parts of the side bars C being fastened to the centers of the side springs E, the downward motion of one half of the body F compels the other half to move with it, thus maintaining a level position of the wagon-body, regardless of the position of the weight, and making the improvement desirable for wagons having two seats, as well as for light carriages.

Having thus described our invention, we claim as new and desire to secure by Letters Patent—

The combination, with side bars C, divided in the middle, of the flexible plate D and spring E, connected at each end to the side-bar sections, and at the middle to each other, as shown and described.

WILLIAM HENRY HAYLOCK.
ALONZO BENEDICT.

Witnesses:
C. A. READ,
GEORGE VAN WIE.